(12) United States Patent
Jeong et al.

(10) Patent No.: US 12,015,621 B2
(45) Date of Patent: Jun. 18, 2024

(54) APPARATUS AND METHOD FOR ESTIMATING SYSTEM STATE

(71) Applicant: DAEGU GYEONGBUK INSTITUTE OF SCIENCE AND TECHNOLOGY, Daegu (KR)

(72) Inventors: Yechan Jeong, Seoul (KR); Yongsoon Eun, Daegu (KR)

(73) Assignee: DAEGU GYEONGBUK INSTITUTE OF SCIENCE AND TECHNOLOGY, Daegu (KR)

( * ) Notice: Subject to any disclaimer, the term of this patent is extended or adjusted under 35 U.S.C. 154(b) by 291 days.

(21) Appl. No.: 17/555,705

(22) Filed: Dec. 20, 2021

(65) Prior Publication Data
US 2022/0353277 A1    Nov. 3, 2022

(30) Foreign Application Priority Data
Apr. 19, 2021    (KR) ........................ 10-2021-0050589

(51) Int. Cl.
*H04L 9/40*    (2022.01)
*G06F 17/16*    (2006.01)

(52) U.S. Cl.
CPC .......... *H04L 63/1416* (2013.01); *G06F 17/16* (2013.01); *H04L 63/1425* (2013.01); *H04L 63/145* (2013.01)

(58) Field of Classification Search
CPC ............. H04L 63/1416; H04L 63/1425; H04L 63/145; H04L 67/12; G06F 17/16; G05B 23/0221
See application file for complete search history.

(56) References Cited

U.S. PATENT DOCUMENTS

2021/0103263 A1 *    4/2021    Dai ...................... G05B 13/048

FOREIGN PATENT DOCUMENTS

| JP | 2021-026755 | 2/2021 | |
| KR | 10-2004-0033315 | 4/2004 | |
| KR | 10-2018-0125277 | 11/2018 | |
| KR | 10-2019-0059024 | 5/2019 | |
| KR | 10-2020-0021277 | 2/2020 | |
| WO | WO-2018229898 A1 * | 12/2018 | ........... G01R 31/367 |

OTHER PUBLICATIONS

Reza Soleymani et al., "Robust adaptive unknown input observer design for a class of disturbed systems", Systems Science & Control Engineering: An Open Access Journal, 2020, vol. 8, No. 1, 249-257, Mar. 25, 2020.
KIPO, Office Action of KR 10-2021-0050589 dated Apr. 29, 2022.
KIPO, Notice of Allowance of the corresponding Korean Patent Application No. 10-2021-0050589 dated Apr. 27, 2023.

* cited by examiner

*Primary Examiner* — Izunna Okeke
(74) *Attorney, Agent, or Firm* — LEX IP MEISTER, PLLC

(57) ABSTRACT

Disclosed are an apparatus and a method for estimating a system state. Accordingly, it is possible to perform Resilient State Estimation (RSE) that is robust to disturbance and is autonomously restored from sensor attack/failure.

15 Claims, 4 Drawing Sheets

APPARATUS AND METHOD FOR ESTIMATING SYSTEM STATE

CROSS-REFERENCE TO RELATED APPLICATION

The present application claims the benefit of priority to Korean Patent Application No. 10-2021-0050589, entitled "APPARATUS AND METHOD FOR SYSTEM STATE ESTIMATION," filed on Apr. 19, 2021, in the Korean Intellectual Property Office, the entire disclosure of which is incorporated herein by reference.

BACKGROUND OF THE INVENTION

1. Field of the Invention

The present disclosure relates to an apparatus and a method for estimating a system state and an apparatus and a method for autonomous Resilient State Estimation (RSE) robust to disturbance.

2. Description of the Prior Art

The following description is only to provide background information related to embodiments of the present disclosure and does not necessarily constitute the prior art.

A Cyber Physical System (CPS) is a field of research on a convergence technology between the physical world and a cyber world and models an operation of a physical system connected to sensors, actuators, controllers, and the like through a network and researches on an interaction.

Meanwhile, a control system technology capable of protecting the system from sensor attack through the network and maximally achieving the purpose of the system even though disturbance due to external attack occurs is needed.

To this end, it is required to design a control system having resiliency from malicious external attack.

SUMMARY OF THE INVENTION

A technical task of the present disclosure is to provide a scheme of designing a partial state UIO capable of partially estimating a state of a system regardless of disturbance.

Another technical task of the present disclosure is to provide an apparatus and a method for estimating a system state to estimate the total system state through partial state UIOs.

Another technical task of the present disclosure is to provide an apparatus and a method for estimating a system state to combine partial state information output from partial state UIOs, remove influence by sensor attack/failure, and estimate a real state of a system.

The technical tasks of the present disclosure are not limited to the above-described matters, and other tasks and advantages of the present disclosure which have not been mentioned may be understood by the following description and more clearly understood by embodiments of the present disclosure. Further, it may be noted that the technical tasks and advantages can be achieved by means in the claim and a combination thereof.

An apparatus for estimating a system state according to an embodiment of the present disclosure includes: a generator configured to generate a plurality of partial state estimation values ($\hat{z}_1, \hat{z}_2, \ldots \hat{z}_p; \hat{z}_i$) for a current state of a target system, based on a control input for the target system and output values ($y_1, y_2, \ldots, y_p; y_i$) of a plurality of sensors disposed in the target system corresponding to state observation values of the target system according to the control input; a combiner configured to determine a set ($\Gamma(\hat{z}(t))$) of a plurality of candidate estimation values ($X(t)$) for a total state estimation value of the target system, based on the plurality of partial state estimation values; and a determiner configured to determine a final state estimation value ($\hat{x}(t)$) for the current state of the target system among the plurality of candidate estimation values ($X(t)$).

A method of estimating a system state according to an embodiment of the present disclosure includes: generating a plurality of partial state estimation values ($\hat{z}_1, \hat{z}_2, \ldots \hat{z}_p; \hat{z}_i$) for a current state of a target system, based on a control input for the target system and output values ($y_1, y_2, \ldots, y_p; y_i$) of a plurality of sensors disposed in the target system corresponding to state observation values of the target system according to the control input, by a generator; determining a set ($\Gamma(\hat{z}(t))$) of a plurality of candidate estimation values ($X(t)$) for a total state estimation value of the target system, based on the plurality of partial state estimation values by a determiner; and determining a final state estimation value ($\hat{x}(t)$) for the current state of the target system among the plurality of candidate estimation values ($X(t)$) by the determiner.

Other aspects, features, and advantages may become clear by the accompanied drawings, the claim, and the detailed description of the present disclosure.

According to an embodiment of the present disclosure, it is possible to obtain an estimation value, which is not influenced by disturbance, from each sensor output through introduction of partial state UIOs.

According to an embodiment of the present disclosure, through the use of partial state UIOs in a structure in which disturbance and sensor failure/attack are removed, a using condition of a state estimation scheme may be alleviated and thus may be applied to a system in a wider range.

Effects of the present disclosure are not limited to the above description, and other effects which have not been mentioned may be clearly understood by those skilled in the art from the following description.

DETAILED DESCRIPTION OF THE EXEMPLARY EMBODIMENTS

Figure 1:
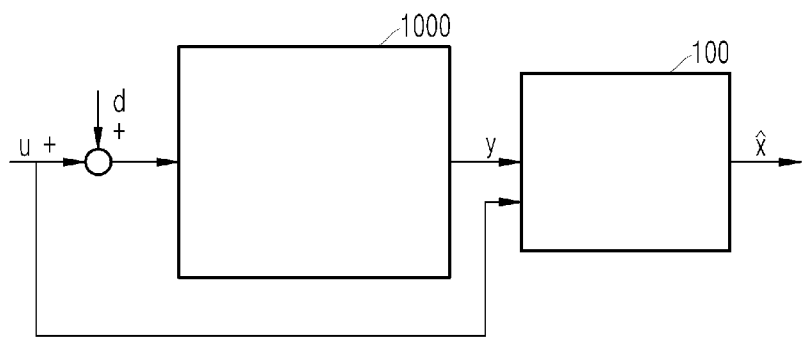
FIG. 1 schematically illustrates an operation environment of a system state estimation device according to an embodiment.

Hereinafter, the present disclosure is described in more detail with reference to the drawings. The present disclosure may be implemented in a plurality of different forms and is not limited to embodiment described herein. In the following embodiments, parts that are not directly related to the description are omitted for clear description, but it does not mean that the omitted parts are not necessary to implement an apparatus or a system to which the idea of the present disclosure is applied. Throughout the specification, the same or similar reference numerals are used for the same or similar elements.

In the following description, the terms "first", "second", or the like may be used to description various elements, but the elements should not be limited by the terms, and the terms are used only to distinguish one element from another element. Further, in the following description, the singular includes plurals unless the context is clearly stated.

In the following description, the terms "include", "have", or the like is intended to indicate that characteristics, numbers, steps, operations, elements, or components disclosed on the specification or a combination thereof exists. Rather, the terms "include" or "have" should be understood so as not to pre-exclude the existence or additionality of one or more other characteristics, numbers, steps, operations, elements, components, or a combination thereof.

Hereinafter, the present disclosure is described in detail with reference to the drawings.

FIG. 1 schematically illustrates an operation environment of a system state estimation device according to an embodiment.

A system state estimation device 100 according to an embodiment estimates a state of a target system 1000 in real time.

The target system 1000 means a physical system performs a series of tasks according to a control input (u). For example, the target system 1000 includes various physical systems having facilities operating by an automated control system such as a plant, a smart factory, a smart farm, and the like.

Various sensors may be disposed in the target system 1000 to monitor an operation state of the target system 1000. The sensor may include sensors capable of detecting physical quantities, such as a location sensor, a temperature sensor, an image sensor, a speed sensor, a humidity sensor, a pressure sensor, a motion sensor, and the like.

The target system 1000 may be influenced by disturbance. The disturbance means jamming due to external action/external factors to change a state of an automatic control system. The disturbance refers to all of the various causes that make a control signal which is never made in a normal state of the target system 1000.

The sensor of the target system 1000 may not operate partially or entirely by mechanical failure and/or attack from the outside. Malfunction of the sensor may be reflected in an output value of the corresponding sensor and cause a sensor output value different from the real current state of the target system 1000.

The system state estimation device 100 may receive a control input (u) for the target system 1000 and a sensor value detected by the sensor disposed in the target system 1000, that is, an output value (y) of the sensor corresponding to an observed value related to the state of the target system 1000 and output an estimation value ($\hat{x}$) of the current state of the target system 1000. Particularly, the system state estimation device 100 according to an embodiment may accurately estimate the current state of the target system 1000 under the disturbance and the sensor failure/attack.

Figure 2:
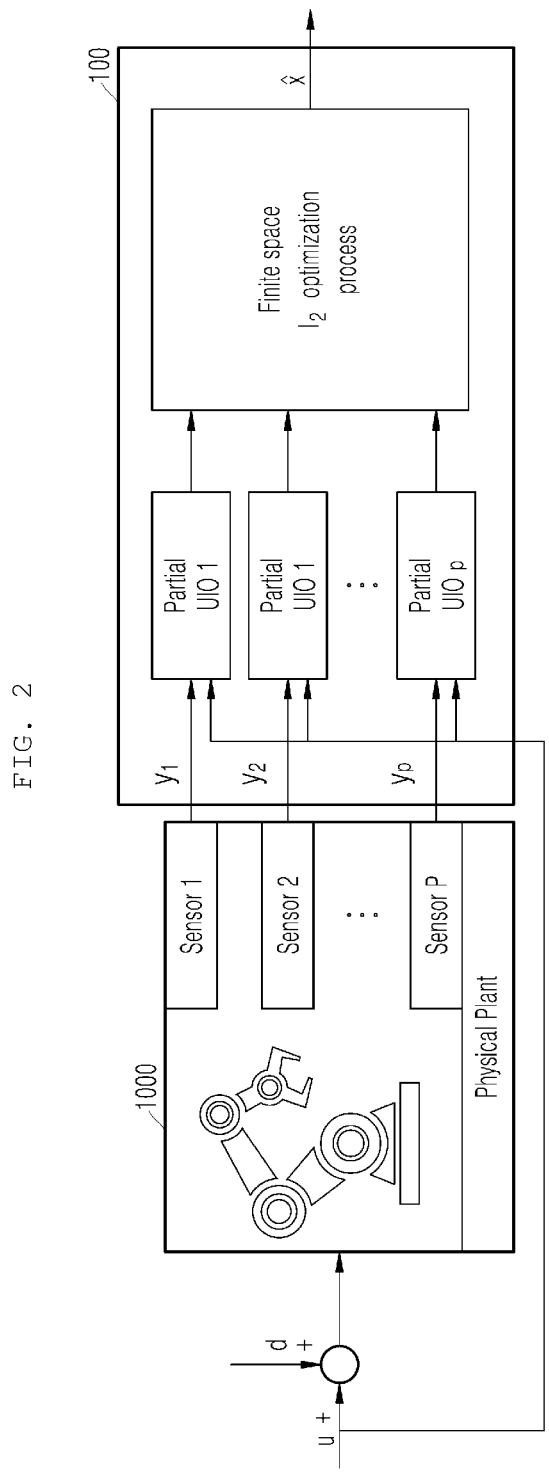
FIG. 2 schematically illustrates a configuration of a system state estimation device according to an embodiment.

FIG. 2 schematically illustrates a configuration of the system estimation device according to an embodiment.

The system state estimation device 100 according to an embodiment may acquire an estimation value which converging on the real current state of the target system 1000 even in the case of disturbance and sensor attack/failure.

The system state estimation device 100 removes an influence by the disturbance (d) and the sensor attack/failure from the estimation value through the following process.

First, a partial state Unknown Input Observer (partial state UIO) is designed for the sensor outputs ($y_1, y_2, \ldots, y_p$) and applied to estimate the system state, and thus a partial state estimation value from which the influence of the disturbance (d) is removed is acquired.

According to an embodiment, through the use of the partial state UIO in a structure in which the disturbance and the sensor failure/attack are removed, a using condition of a system state estimation scheme may be alleviated and thus may be applied to a system in a wider range.

Subsequently, a plurality of candidate estimation values indicating the whole state of the target system 1000 are generated by combining partial state estimation values output by the partial state UIOs. Among the plurality of candidate estimation values, a candidate obtained by a combination of partial state estimation values without any influence by the sensor attack/failure must exist. Such a candidate is found through a finite space optimization process, and the found value is returned as a final state estimation value ($\hat{x}$) for the current state of the target system 1000.

An effect of significantly reducing an operation time by dramatically decreasing a search space through the finite space optimization process may be created.

Hereinafter, a system state estimation process according to an embodiment is described in more detail.

Figure 3:
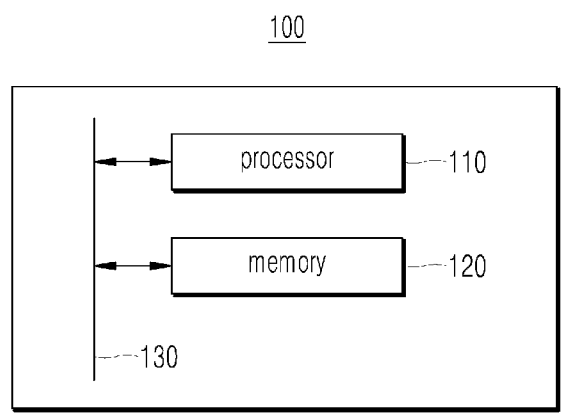
FIG. 3 is a block diagram illustrating the system state estimation device according to an embodiment.

FIG. 3 is a block diagram illustrating the system state estimation device according to an embodiment.

The system state estimation device 100 according to an embodiment may include a processor 110.

The processor 110 is a kind of central processing units, and may execute one or more commands stored in a memory 120 described below to control the operation of the system state estimation device 100. The processor 110 may include any type of device capable of processing data.

The processor 110 may execute a program including one or more commands corresponding to a generator 20, a combiner 30, and a determiner 40 described below with reference to FIG. 4 to perform the system state estimation process.

The processor 110 may be, for example, a data processing device embedded into hardware, having a physically structured circuit to perform a function expressed by a code or a command included in the program. For example, the data processing device embedded into hardware may include processing devices such as a microprocessor, a Central Processing Unit (CPU), a processor core, a multiprocessor, an Application-Specific Integrated Circuit (ASIC), a Field Programmable Gate Array (FPGA), and the like, but is not limited thereto. The processor 110 may include one or more processors. The processor 110 may include at least one core.

The system estimation device 100 may include the memory 120.

The memory 120 may store commands for operating the system estimation device 100. The memory 120 may store a program for executing the system estimation process according to an embodiment. The memory 120 may store an executable program including the generator 20, the combiner 30, and the determiner 40 described below with reference to FIG. 4.

The processor 110 may estimate the system state according to an embodiment on the basis of the program and commands stored in the memory 120.

The memory 120 may include an internal memory and/or an external memory, for example, a volatile memory such as a DRAM, an SRAM, an SDRAM, or the like, a nonvolatile memory such as One Time Programmable ROM (OTPRAM), a PROM, an EPROM, an EEPROM, a mask ROM, a flash ROM, a NAND flash memory, a NOR flash memory, or the like, a flash drive such as an SSD, a Compact Flash (CF) card, an SD card, a micro-SD card, a mini-SD card, an Xd card, a memory stick, or the like, or a storage device such as an HDD. The memory 120 may include magnetic storage media or flash storage media, but is not limited thereto.

The system estimation device 100 may further include a bus 130. The bus 130 is a logical/physical path connecting the processor 110 and the memory 120. The processor 110 may read/write the memory 120 through the bus 130.

Figure 4:
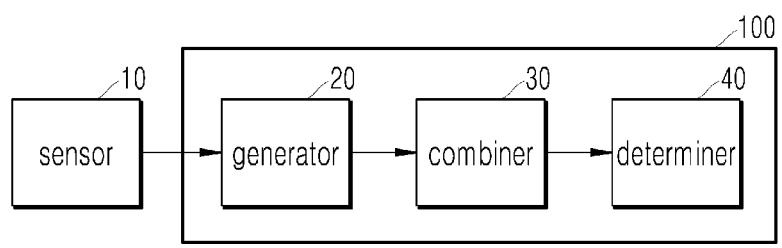
FIG. 4 is a functional block diagram illustrating the system state estimation device according to an embodiment.

FIG. 4 is a functional block diagram illustrating the system state estimation device according to an embodiment.

The system state estimation device 100 may include the generator 20 configured to generate a plurality of partial state estimation values for the current state of the target system 1000 on the basis of a control input for the target system 1000 and output values of the plurality of sensors 10 disposed in the target system 1000 corresponding to state observation values of the target system 1000 according to the control input, the combiner 30 configured to determine a set of a plurality of candidate estimation values for the whole state estimation value of the target system 1000 on the basis of the plurality of partial state estimation values, and the determiner 40 configured to determine a total state estimation value for the current state of the target system 1000 among the plurality of candidate estimation values.

The system state estimation device 100 may include the generator 20 configured to generate a plurality of partial state estimation values for the current state of the target system 1000 on the basis of the control input for the target system 1000 and the output values of the plurality of sensors 10 disposed in the target system 1000 corresponding to the state observation values of the target system 1000 according to the corresponding control input.

In an embodiment, the generator 20 may include a plurality of partial state Unknown Input Observers (partial state UIOs).

Each of the plurality of partial state UIOs may be configured to generate one partial state estimation value on the basis of an output value of one sensor among the plurality of sensors 10 and a control input for the target system 1000, the one sensor being different for each partial state UIO.

In an embodiment, the plurality of partial state estimation values and the final state estimation value may be expressed by vectors, a dimension of a vector indicating the partial state estimation value may be lower than a dimension of a vector indicating the final state estimation value.

A detailed operation of the generator 20 is described below in operation (S2) with reference to FIG. 5.

In an embodiment, the plurality of partial state UIOs may be associated with the plurality of sensors 10 one to one. Each partial state UIO may generate one of the plurality of partial state estimation values by calculating an observer state function of each partial state UIO on the basis of the output value of the sensor associated with itself among the plurality of sensors 10 and the control input for the target system 1000.

That is, each partial state UIO may be designed to generate one of the plurality of state estimation values on the basis of an observer state function ($g_i$) induced by a dynamic state equation of the target system 1000.

The generator 20 designs the plurality of partial state UIOs by performing a first calculation to a seventh operation below.

The generator 20 may perform the first calculation for generating a first observability matrix ($A_i^1$) and a second observability matrix (G) on the basis of a property matrix (A) of the dynamic state equation of the target system 1000 and an output matrix (C) for the plurality of sensors in order to generate the observer state function ($g_i$) and the plurality of partial state estimation values ($\hat{z}_1, \hat{z}_2, \hat{z}_3, \ldots \hat{z}_p; \hat{z}_i$).

After the first calculation, the generator 20 may further perform the second calculation for generating a first linear transformation matrix ($M_i$) on the basis of a range space (P) of a transpose matrix ($G^T$) of the second observability matrix (G) and orthogonal bases (Q) of a null space of the second observability matrix (G).

After the second calculation, the generator 20 may further perform the third calculation for generating a second linear transformation matrix ($M_i A_i^1 M_i^T$) by performing a coordinate change for the first observability matrix ($A_i^1$) through the first linear transformation matrix ($M_i$).

After the third calculation, the generator 20 may further perform the fourth calculation for generating a fourth linear transformation matrix ($N_i' A_i^o N_i'^{-1}$) by performing a coordinate change for a matrix block ($A_i^o$) through a third linear transformation matrix ($N_i'$) which makes a matrix block ($A_i$ $\bar{o}$) of the second linear transformation matrix ($M_i A_i^1 M_i^T$) to be block diagonal.

After the fourth calculation, the generator 20 may further perform the fifth calculation for generating a sixth linear transformation matrix ($T_i$) on the basis of a fifth linear transformation matrix ($N_i$) defined on the basis of the third linear transformation matrix, and the first linear transformation matrix ($M_i$).

After the fifth calculation, the generator 20 may further perform the sixth calculation for generating a seventh linear transformation matrix ($U_i$) and an eighth linear transformation matrix ($V_i$) on the basis of the sixth linear transformation matrix ($T_i$) and an inverse matrix ($T_i^{-1}$) of the sixth linear transformation matrix ($T_i$).

After the sixth calculation, the generator 20 may further perform the seventh calculation for transforming the dynamic state equation of the target system 100 on the basis of a seventh linear transformation matrix ($U_i$) and an eighth linear transformation matrix ($V_i$).

The first calculation to the seventh calculation for designing the partial state UIOs will be described in operation S1 with reference to FIG. 5.

The system state estimation device 100 may include the combiner 30 configured to determine a set of a plurality of candidate estimation values for a total state estimation value of the target system 1000 on the basis of the plurality of partial state estimation values.

The combiner 30 may be configured to determine a malfunction sensor number threshold on the basis of the number of sensors included in the plurality of sensors 10, determine the number of cases for combinations of a plurality of partial state estimation values on the basis of the malfunction sensor number threshold, and select a partial state estimation value to be included in each of the plurality of candidate estimation values among the plurality of partial state estimation values.

Specifically, the operation of the combiner 30 is described below in operation S3 with reference to FIG. 5.

The system state estimation device 100 may include the determiner 40 configured to determine the total state estimation value for the current state of the target system 1000 among the plurality of candidate estimation values.

With respect to each candidate estimation value (X(t)), the determiner 40 may determine a final state estimation value ($\hat{x}(t)$) on the basis of a distance ($\|\hat{z}_i - U_i X\|_2$) between the partial state estimation value ($\hat{z}_i$) included in each candidate estimation value (X(t)) and a vector obtained by multiplying the first transformation matrix ($U_i$) and each candidate estimation value (X(t)).

The first transformation matrix ($U_i$) corresponds to a pseudo inverse matrix for linear transformation between the partial state estimation value ($\hat{z}_i$) and the real state value (X(t)) of the target system. In an embodiment, the first transformation matrix ($U_i$) may be a matrix which is the same as the seventh transformation matrix ($U_i$) and is described below with reference to [Equation 9].

Meanwhile, the determiner 40 may re-generate a control input for the target system 1000 on the basis of the finally determined total state estimation value.

A detailed operation of the determiner 40 is described below in operation S4 with reference to FIG. 5.

Figure 5:
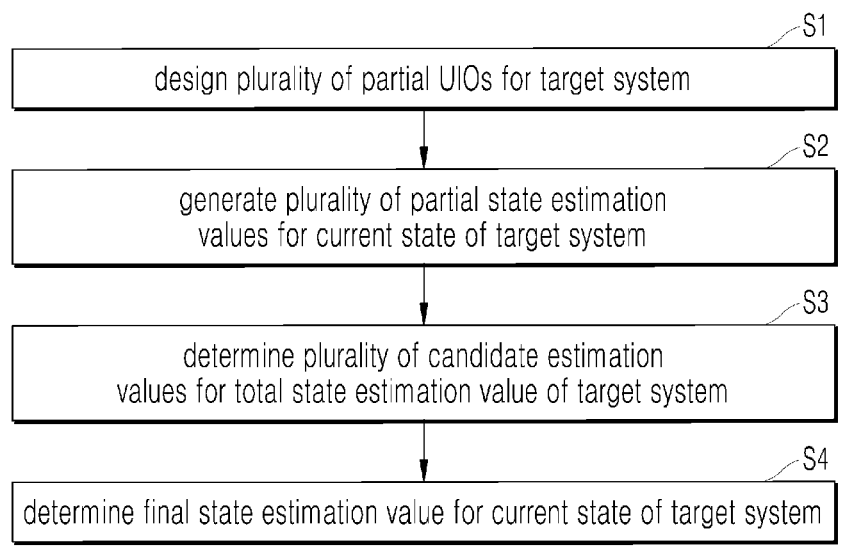
FIG. 5 is a flowchart illustrating a system state estimation method according to an embodiment.

FIG. 5 is a flowchart illustrating a system state estimation method according to an embodiment.

The system state estimation method according to an embodiment may include operation S1 of designing a plurality of UIOs included in the generator 20.

Operation S1 may include an operation of inducing an observer state function of the plurality of partial state UIOs from a dynamic state equation of the target system 1000.

In an embodiment, the operation of inducing the observer state function of the plurality of partial state UIOs may include a first calculation operation to a seventh calculation operation.

First, short-period dynamics of an aircraft is indicated by [Equation 1].

$$\dot{x}(t) = Ax(t) + R(u(t) + d(t)) \quad \text{[Equation 1]}$$
$$y(t) = Cx(t)$$

A single input multiple output linear time invariant system having a structure indicated by [Equation 2] below is considered as the dynamic state equation of the target system 1000.

$$\dot{x}(t) = Ax(t) + Bu(t) + Ed(t) \quad \text{[Equation 2]}$$
$$y(t) = Cx(t) + a(t) = [c_1^T c_2^Y \ldots c_p^T]^T + [a_1(t)a_2(t) \ldots a_p(t)]^T$$

In [Equation 2], $x \in R^n$ denotes a state of the target system 1000, $u \in R$ denotes a control input for the target system 1000, $d \in R$ denotes disturbance existing in the target system 1000, $y \in R^p$ denotes (for example, p) output values of the plurality of sensors 10, and $a \in R^p$ denotes sensor attack.

A matrix A denotes a property matrix of the dynamic state equation ([Equation 1]) and a matrix C denotes an output matrix for the plurality of sensors 10. A, B, E, C are coefficient vectors, and have dimensions suitable for a vector to be multiplied by respective coefficient vectors.

It is assumed that the system of [Equation 2] satisfies the following conditions to design a partial state Unknown Input Observer (partial state UIO) for each of the plurality of sensors 10 disposed in the target system 1000.

$$\text{rank}(c_i E) \neq 0, i = 1, 2, \ldots, p \quad \text{[Condition 1]}$$

Condition 1 is a condition for disturbance in the target system 1000.

First, the first calculation operation may generate a first observability matrix ($A_i^1$) and a second observability matrix (G) on the basis of a property matrix (A) of the dynamic state equation ([Equation 2]) of the target system 1000 and an output matrix (C) for the plurality of sensors 10.

In the first calculation operation, the first observability matrix ($A_i^1$) and the second observability matrix (G) are defined as shown in [Equation 3] below.

$$A1 = A - E[(c_i E)^T c_1 E]^{-1} (c_i E)^T c_i A \quad \text{[Equation 3]}$$
$$G = [(c_i)^T (c_i A_i)^T (c_i (A_i^1)^2)^T \ldots (c_i (A_i^1)^{n-1})^T]^T$$

The second calculation operation may generate a first linear transformation matrix ($M_i$) on the basis of a range space (P) of a transpose matrix ($G^T$) of the second observability matrix (G) and orthogonal bases (Q) of a null space of the second observability matrix (G).

That is, a matrix $P_i \in R^{1 \times n}$, $Q_i \in R^{(n-1) \times n}$ is derived from the second observability matrix (G), and respective columns correspond to the range space of the transpose matrix ($G^T$) of the second observability matrix (G) and the orthogonal bases (Q) of the null space of the transpose matrix ($G^T$) of the second observability matrix (G).

The first linear transformation matrix ($M_i$) is defined as shown in [Equation 4].

$$M_i = [P_i^T Q_i^T]^T \quad \text{[Equation 4]}$$

The third calculation operation may generate a second linear transformation matrix ($M_i A_i^1 M_i^T$) by performing a coordinate change for the first observability matrix ($A_i^1$) through the first linear transformation matrix ($M_i$) as shown in [Equation 5].

$$M_i A_i^1 M_i^T = \begin{bmatrix} A_i^o & 0_{1 \times (n-1)} \\ A_{21} & A_i^{\bar{o}} \end{bmatrix} \quad \text{[Equation 5]}$$

In [Equation 5], $A_i^o \in R$, $A_i^{\bar{o}} \in R^{(n-1) \times (n-1)}$

Subsequently, the fourth calculation operation may generate a fourth linear transformation matrix ($N_i' A_i^{\bar{o}} N_i'^{-1}$) by performing a coordinate change for a matrix block ($A_i^{\bar{o}}$) through a third linear transformation matrix ($N_i'$) which makes the matrix block ($A_i^{\bar{o}}$) of the second linear transformation matrix ($M_i A_i^1 M_i^T$) to be block diagonal.

The third linear transformation matrix $N_i' \in R^{(n-1) \times (n-1)}$ which makes the matrix block $A_i^{\bar{o}}$ to be block diagonal always exists, and the fourth linear transformation matrix ($N_i' A_i^{\bar{o}} N_i'^{-1}$) is shown in [Equation 6] below.

$$N_i' A_i^{\bar{o}} N_i'^{-1} = \begin{bmatrix} A_i^{\bar{o}s} & 0_{(m_i-1) \times (n-m_i)} \\ 0_{(n-m_i)(m_i-1)} & A_i^{\overline{os}} \end{bmatrix} \quad \text{[Equation 6]}$$

In [Equation 6], $A_i^{\bar{o}s} \in R^{(m_i-1) \times (m_i-1)}$ is a matrix having a negative number in a real part of an eigenvalue, and $$A_i^{\overline{os}} \in R^{(m_i-1) \times (m_i-1)}$$

is a matrix having a positive number in a real part of an eigenvalue.

The fifth calculation operation may generate a sixth linear transformation matrix ($T_i$) on the basis of a fifth linear transformation matrix ($N_i$) defined on the basis of the third linear transformation matrix ($N_i'$), and the first linear transformation matrix ($M_i$).

In an example, the sixth linear transformation matrix ($T_i$) is defined as shown in [Equation 7] below.

$$T_i = N_i M_i \qquad \text{[Equation 7]}$$

The fifth linear transformation matrix ($N_i$) is defined according to [Equation 8] below.

$$N_i = \begin{bmatrix} 1 & 0_{1 \times (n-1)} \\ 0_{(n-1)} & N_i' \end{bmatrix} \qquad \text{[Equation 8]}$$

The sixth linear transformation matrix ($T_i$) may be divided as $T_i = [(T_i^o)^T (T_i^{\overline{os}})^T (T_i^{\overline{os}})^T]$, and $(T_i^o)^T, (T_i^{\overline{os}})^T, (T_i^{\overline{os}})^T$ have 1, $m_i-1$, $n-m_i$ columns, respectively.

Similarly, an inverse matrix ($T_i^{-1}$) of the sixth linear transformation matrix ($T_i$) is defined as $T_i^{-1} = [(T_i^o)^T (T_i^{\overline{os}})^T (T_i^{\overline{os}})^T]$, and $(T_i^o)^T, (T_i^{\overline{os}})^T, (T_i^{\overline{os}})^T$ have 1, $m_i-1$, $n-m_i$ rows, respectively.

The sixth calculation operation may generate a seventh linear transformation matrix ($U_i$) and an eighth linear transformation matrix ($V_i$) on the basis of the sixth linear transformation matrix ($T_i$) and the inverse matrix ($T_i^{-1}$) of the sixth linear transformation matrix ($T_i$).

The seventh linear transformation matrix ($U_i$) and the eighth linear transformation matrix ($V_i$) may be generated according to [Equation 9] on the basis of the sixth linear transformation matrix ($T_i$) and the inverse matrix ($T_i^{-1}$) of the sixth linear transformation matrix ($T_i$).

$$U_i = \begin{bmatrix} T_i^o \\ T_i^{\overline{os}} \end{bmatrix}, V_i = \begin{bmatrix} T_i^o & T_i^{\overline{os}} \end{bmatrix} \qquad \text{[Equation 9]}$$

The seventh calculation operation may transform the dynamic state equation for the target system 1000 of [Equation 2] on the basis of the seventh linear transformation matrix ($U_i$) and the eighth linear transformation matrix ($V_i$).

That is, A,B,E,$C_i$ of [Equation 2] may be transformed as follows through the seventh linear transformation matrix ($U_i$) of [Equation 9].

$$A_i^s = U_i A V_i, \; B_i^s = U_i B, \; E_i^s = U_i E, \; c_i^s = c_i V_i \qquad \text{[Equation 10]}$$

In condition 1, a partial state UIO may be designed as follows using the matrix of [Equation 9].

$$\dot{g}_i(t) = F_i g_i(t) + R_i B_i^S u(t) + K_i y_i(t), \qquad \text{[Equation 11]}$$
$$\hat{z}_i(t) = g_i(t) + H_i y_i(t)$$

In [Equation 11], $g_i \in R^{m_i}$ denotes an observer state, and $\hat{z}_i \in R^{m_i}$ denotes an estimation value of the state of the target system 1000.

Matrixes $F_i$, $R_i$, $K_i$, $H_i$ may be configured as shown in $$H_i = E_i^S \left[ (c_i^S E_i^S)^\top c_i^S E_i^S \right]^{-1} (c_i^S E_i^S)^\top, \qquad \text{[Equation 12]}$$
$$R_i = I - H_i c_i^S,$$
$$F_i = A_i^S - H_i c_i^S A_i^S - K_{i,1} c_i^S,$$
$$K_{i,2} = F_i H_i,$$
$$K_i = K_{i,1} + K_{i,2}$$

In [Equation 12], $K_{i,1}$ is configured to make real parts of all eigenvalues of $F_i$ negative numbers, and the parameter configuration is always possible (can be proved mathematically).

A vector obtained by transforming the state of the target system 1000 in [Equation 2] to the sixth linear transformation matrix ($T_i$) is defined as $z_i(t) = U_i x(t)$. It is noted that $z_i(t)$ includes partial state information of the target system 1000 since $z_i(t)$ has a lower dimension than the real current state $x(t)$ of the target system 1000.

When the partial state UIO is designed according to [Equation 5] to [Equation 12], an estimation error between $z_i(t)$ and a state estimation value ($\hat{z}_i(t)$) estimated by the partial state UIO on the basis of the observer state ($g_i(t)$) is indicated by [Equation 13] below.

$$\dot{z}_i(t) - \dot{\hat{z}}_i(t) = F_i(z_i(t) - \hat{z}_i(t)) - K_i a_i(t) - H_i \dot{a}_i(t) \qquad \text{[Equation 13]}$$

The solution to [Equation 13] is obtained as follows.

$$z_i(t) - \hat{z}_i(t) = \exp(F_i t)(z_i(0) - \hat{z}_i(0)) + \qquad \text{[Equation 14]}$$
$$\int_0^t \exp(F_i(t-\tau))(-K_i a_i(\tau) - H_i \dot{a}_i(\tau)) d\tau$$

In [Equation 14], $z_i(0)$, $\hat{z}_i(0)$ are initial values of $z_i(t)$, $\hat{z}_i(t)$, respectively.

In [Equation 15], there is no attack on an $i^{th}$ sensor.

$$z_i(t) - \hat{z}_i(t) = \exp(F_i t)(z_i(0) - \hat{z}_i(0)) \qquad \text{[Equation 15]}$$

Real parts of eigenvalues of $F_i$ are all negative numbers, and thus the difference between $z_i(t)$ and $\hat{z}_i(t)$ converges on 0 by an exponential function as time goes on.

Accordingly, the partial state UIO according to an embodiment based on the equations may output a partial state estimation value having no influence by disturbance.

The system state estimation method according to an embodiment may include operation S2 of generating a plurality of partial state estimation values ($\hat{z}_1, \hat{z}_2, \hat{z}_3, \ldots \hat{z}_p$; $\hat{z}_i$) for the current state of the target system 1000 on the basis of a control input for the target system 1000 and output values ($y_1, y_2, y_3 \ldots y_p$; $y_i$) of the plurality of sensors 10 disposed in the target system 1000 corresponding to state observation values of the target system 1000 by the generator 20, operation S3 of determining a set ($\Gamma(\hat{z}(t))$) of a plurality of candidate estimation values ($X(t)$) for a total state estimation value of the target system 1000 on the basis of a plurality of partial state estimation values by the combiner 30, and operation S4 of determining a final state estimation value ($\hat{x}(t)$) for the current state of the target system 1000 among the plurality of candidate estimation values (X(t)) by the determiner 40.

In operation S2, the generator 20 may generate a plurality of partial state estimation values ($\hat{z}_1, \hat{z}_2, \hat{z}_3, \ldots \hat{z}_p$; $\hat{z}_i$) for the current state of the target system 1000 on the basis of a control input for the target system 1000 and output values ($y_1, y_2, y_3 \ldots y_p$; $y_i$) of the plurality of sensors 10 disposed in the target system 1000 corresponding to state observation values of the target system 1000 according to the control input.

The generator 20 may include a plurality of partial state UIOs designed in operation S1. In an example, the plurality of partial state UIOs may be associated with the plurality of sensors 10 disposed in the target system 1000 one to one. That is, the generator 20 may include the plurality of partial state UIOs corresponding to the number of plurality of sensors.

In operation S2, the generator 20 is executed by the processor 100 and may determine each partial state estimation value ($\hat{z}_i$) of the target system 1000 on the basis of the output value ($y_i$) of each of the plurality of sensors 10 and an observer state ($g_i$) of the partial state UIO associated with each sensor.

In an example, the plurality of partial state estimation values generated by the generator 20 and the final state estimation value determined by the determiner 40 are indicated by vectors, and a dimension of the vector indicating each partial state estimation value is lower than the vector indicating the final state estimation value.

For example, when total state information of the target system 1000 is an $n^{th}$-dimensional vector, the partial state estimation value may be an $m^{th}$-dimensional vector, m being a positive integer smaller than n.

That is, the partial state estimation value may include some pieces of state information in the total state information of the target system 1000.

In operation S3, the combiner 30 may determine a set ($\Gamma(\hat{z}(t))$) of a plurality of candidate estimation values (X(t)) for the total state estimation value of the target system 1000 on the basis of the plurality of partial state estimation values ($\hat{z}_1, \hat{z}_2, \hat{z}_3, \ldots \hat{z}_p$; $\hat{z}_i$) generated in operation S2.

For description, mathematical expressions are introduced. For a predetermined matrix $M_i \in R^{m_i \times n}$, $M=[M_1^T M_2^T \ldots M_p^T]^T$ is defined. Further, there is a subset $\Lambda$ of a set $\{1, 2, \ldots, p\}$. $M_\Lambda$ is defined as a matrix from which $M_i$ expressed by a number i, which is not included in the subset $\Lambda$, is removed from M. The size of the set $\Lambda$ is indicated by $|\Lambda|$.

In operation S3, the combiner 30 generates a set of the plurality of candidate estimation values (X(t)) for the real current state (x(t)) of the target system 1000 by combining the partial state estimation values ($\hat{z}_i(t)$) acquired from each partial state UIO in operation S2.

$$\hat{Z} = \left[\hat{z}_1^T \hat{z}_2^T \ldots \hat{z}_p^T\right]^T, \Phi = \left[U_1^T U_2^T \ldots U_p^T\right]^T \quad \text{[Equation 16]}$$

According to [Equation 16], the set ($\Gamma(\hat{z}_i(t))$) of the plurality of candidate estimation values (X(t)) may be calculated as follows.

$$\Gamma(\hat{z}(t)) = \quad \text{[Equation 17]}$$
$$\{x(t) \in R^n : x(t) = (\Phi_\Lambda)^\dagger \hat{z}_\Lambda(t), \Lambda \subset \{1, 2, \ldots, p\}, |\Lambda| = p - q\}$$

In [Equation 17], p denotes the number of sensors disposed in the target system 1000, and q denotes the number of attacked sensors. A matrix $\Phi_\Lambda$, is a matrix obtained by removing the remaining indexes except for $U_1$ corresponding to indexes in the set $\Lambda$ are removed from a matrix $\Phi$ of [Equation 16].

Such a scheme assumes that the number q is smaller than the half of p. In a candidate set $\Gamma(\hat{z}(t))$, at least one element (X(t)) having no influence by sensor failure/attack necessarily exists.

In an example, the combiner 30 may determine a malfunction sensor number threshold on the basis of the number of plurality of sensors 10 and determine the number of cases for combinations of the plurality of partial state estimation values on the basis of the determined malfunction sensor number threshold in operation S3.

For example, when the number of sensors is 4 (p=4), the combiner 30 may determine that the malfunction sensor number threshold is 1 (q=1). The combiner 30 may determine that the number of cases for combinations of the plurality of partial state estimation values is 4 according to the number of cases (combinations) in which 3 sensors (obtained by subtracting the malfunction sensor number threshold from the number of all sensors; p–q) are selected from among a total of 4 sensors in no particular order.

The combiner 30 may select a partial state estimation value to be included in each of the plurality of estimation values from among the plurality of partial state estimation values according to the determined number of cases.

The combiner 30 may select a partial state estimation value to be included in each candidate estimation value according to the number of cases in which 3 sensors are selected from among a total of 4 sensors in no particular order.

For example, the combiner 30 may determine combinations of 3 partial state estimation values through a method of selecting 3 partial state estimation values from among 4 partial state estimation values in no particular order.

That is, when the four partial state estimation values are Z1, Z2, Z3, and Z4, a first combination (Z1, Z2, Z3), a second combination (Z1, Z2, Z4), a third combination (Z1, Z3, Z4), and a fourth combination (Z2, Z3, Z4) may be determined.

In operation S4, the combiner 40 may determine a final state estimation value ($\hat{x}(t)$) for the current state of the target system 1000 among the plurality of candidate estimation values (X(t)).

To this end, the determiner 40 may select a candidate estimation value having a minimum estimation error among the respective candidate estimation values of the plurality of candidate estimation values (X(t)) determined in operation S3 as the final state estimation value ($\hat{x}(t)$) in operation S4.

Operation S4 is a process of selecting a candidate estimation value indicating the real state of the target system 1000 among the plurality of candidate estimation a values. This corresponds to finite space $l_2$ optimization process illustrated in FIG. 2.

The optimization process may be indicated by [Equation 18] below.

$$\text{argmin}_{x(t) \in \Gamma(\hat{z}(t))} |\{i \in \{1, 2, \ldots, p\} : \|\hat{z}_i - U_i x\|_2 > \epsilon_{max}'\}| \quad \text{[Equation 18]}$$

In [Equation 18], $\epsilon_{max}'$ denotes a threshold configured by a system parameter, and is configured according to [Equation 19] below.

$$\epsilon_{max}' = \sqrt{p-q}\,\epsilon_{max}, \exp(F_i t)(z_i(0) - \hat{z}_i(0)) < \epsilon_{max} \quad \text{[Equation 19]}$$

The matrix $\Phi_\Lambda$ (described below [Equation 17]) varies depending on a set lambda ($\Lambda$). Condition 2 is defined below.
[Condition 2]
For all cases in which the number of elements in a subset lambda ($\Lambda \subset \{1, 2, \ldots, p\}$) is larger than p−2q, a corresponding $\Phi_\Lambda$ has a full column rank.

When condition 2 is satisfied, that is, when a corresponding $\Phi_\Lambda$ has a full column rank for all subset lambdas in which the number of elements in the subset lambda ($\Lambda \subset \{1, 2, \ldots, p\}$) is larger than p−2q, the candidate state (X(t)) selected in the optimization process of [Equation 18] is not influenced by sensor attack.

When it is assumed that q sensors are attacked among a total of p sensors, p−q partial state estimation values may converge on $z_i(t) = U_i x(t)$ and q partial state estimation values may not converge on $z_i(t) = U_i x(t)$ among the plurality of partial state estimation values ($\hat{z}_i$).

Accordingly, if the given candidate estimation value (X(t)) is a candidate indicating the real state (x(t)) of the target system 1000, $\hat{z}_i(t) - U_i X(t)$ converges on 0 for a minimum of p−q partial state estimation values ($\hat{z}_i$) as time goes on. For the candidate estimation values, a maximum of q sensors, which satisfy the inequation in [Equation 18], are broken/attacked.

For candidate estimation values (X(t)) different from the real state, $\hat{z}_i(t) - U_i X(t)$ may not converge on 0 for all partial state estimation values ($\hat{z}_i(t)$). The reason why $\hat{z}_i(t) - U_i X(t)$ becomes 0 for the candidate estimation value different from the reality is the matrix $U_i$ is not a square matrix having an inverse matrix. However, when condition 2 is satisfied, the solution of optimization of [Equation 18] always indicates the real state of the target system 1000. Accordingly, the result of [Equation 18] is the candidate estimation value X(t) which does not include influence by sensor attack and disturbance.

That is, in order to determine the final state estimation value ($\hat{x}(t)$) in operation S4, the determiner 40 may determine, for every candidate estimation value (X(t)), the final state estimation value ($\hat{x}(t)$) on the basis of the distance ($\|\hat{z}_i - U_i X\|_2$) between the partial state estimation value (X(t)) included in each candidate estimation value (X(t)) and a vector obtained by multiplying the first transformation matrix ($U_i$) and each candidate estimation value (X(t)) (see [Equation 18]).

The first transformation matrix ($U_i$) corresponds to a pseudo inverse matrix for linear transformation between the partial state estimation value ($\hat{z}_i$) and the real state value (x(t)) of the target system. In an embodiment, the first transformation matrix ($U_i$) may be a matrix which is the same as the seventh linear transformation matrix ($U_i$) described with reference to [Equation 9].

Meanwhile, the following definition is made for an estimation error between the candidate estimation value X(t) which does not include influence of sensor attack and disturbance and the real state.

$$\epsilon(t) = \left[\epsilon_1^\top(t)\epsilon_2^\top(t) \ldots \epsilon_p^\top(t)\right]^\top, \epsilon_i(t) = \exp(F_i t)(z_i(0) - \hat{z}_i(0)) \quad \text{[Equation 20]}$$

$$\hat{z}_{max} = \max\{z_i(0) - \hat{z}_i(0), i = 1, 2, 3, \ldots, p\}$$

Accordingly, the estimation error is described as shown in the following equation.

$$\begin{aligned}\|x(t) - \chi(t)\|_2 &= \|x(t) - (\Phi_\Lambda^u)^\dagger \hat{z}_\Lambda(t)\|_2 \\ &= \|x(t) - (\Phi_\Lambda^u)^\dagger(\Phi_\Lambda^u x(t) + \epsilon_\Lambda)\| \\ &= \|(\Phi_\Lambda^u)^\dagger \epsilon_\Lambda\|_2 \leq \|(\Phi_\Lambda^u)^\dagger\|_2 \|\epsilon_\Lambda\|_2\end{aligned} \quad \text{[Equation 21]}$$

In [Equation 21], real parts of eigenvalues of $F_i$ are all negative values, and thus $\gamma_e, \lambda_e$ which satisfies $$\|\epsilon_i(t)\|_2 \leq \gamma_e \hat{z}_{max} \exp(-\lambda_e t)$$

can be always found.
[Equation 21] becomes [Equation 22] therethrough.

$$\|(\Phi_\Lambda^u)^\dagger\|_2 \|\epsilon_\Lambda\|_2 \leq \gamma_e \sqrt{p-q} \|(\Phi_\Lambda^u)^\dagger\|_2 \hat{z}_{max} \exp(-\lambda_e t) \quad \text{[Equation 22]}$$

Finally, the following estimation error may be induced by configuring $\gamma, \lambda$ satisfying $$\gamma_e \sqrt{p-q} \|(\Phi_\Lambda^u)^\dagger\|_2 < \gamma$$

and $0 < \lambda < \lambda_e$.

$$\|x(t) - x(t)\|_2 \leq \gamma \hat{z}_{max} \exp(-\lambda t) \quad \text{[Equation 23]}$$

[Equation 23] converges 0 by an exponential function as time goes on.

Accordingly, the system state estimation device 100 according to an embodiment may provide a state estimation value which converges on the real state of the target system 1000 regardless of sensor failure/attack and disturbance.

Meanwhile, the determiner 40 may re-generate the control input for the target system 1000 on the basis of the final state estimation value.

The embodiments according to the present disclosure may be implemented in the form of a computer program which can be executed through various elements in a computer, and the computer program may be recorded in a computer-readable medium. The computer-readable medium may include magnetic media such as hard disks, Solid State Drive (SSD), Silicon Disk Drive (SDD), floppy disks, and magnetic tapes, optical recording media such as a CD-ROM and a DVD, magneto-optical media such as floptical disks, and hardware devices such as a ROM, a RAM, and a flash memory, which are specially configured to store and execute program instructions.

Meanwhile, the computer program may be specifically designed for the present disclosure, and may be known to and used by those skilled in computer software fields. Examples of the computer program may include machine language code generated by a compiler and high-level language code executable by a computer through an interpreter or the like.

The description of the embodiments of the present disclosure is for an example, and it may be understood by those skilled in the art that the embodiments can be easily modified to other detailed forms without departing from the technical idea or necessary features of the present disclosure. Therefore, the embodiments should be understood as examples but not restrictive in all aspects. For example, each element mentioned in a singular form may be implemented in a distributed manner, and also elements mentioned in a distributed form may be implemented in a combination form.

The scope of the present disclosure is defined by the claim below rather than the detailed description, and all modifications or changed forms derived from the meaning and the range of the claim, and the equivalent concept thereof should be construed as being included in the scope of the present disclosure.

What is claimed is:

1. An apparatus for estimating a system state, the apparatus comprising:
at least one processor configured to:
generate a plurality of partial state estimation values $(\hat{z}_1, \hat{z}_2, \ldots \hat{z}_p; \hat{z}_i)$ for a current state of a target system, based on a control input for the target system and output values $(y_1, y_2, \ldots, y_p; y_i)$ of a plurality of sensors disposed in the target system corresponding to state observation values of the target system according to the control input;
determine a set $(\Gamma(\hat{z}(t))$ of a plurality of candidate estimation values $(X(t))$ for a total state estimation value of the target system, based on the plurality of partial state estimation values; and
determine a final state estimation value $(\hat{x}(t))$ for the current state of the target system among the plurality of candidate estimation values $(X(t))$,
wherein, in order to generate the observer state $(g_i)$ and the plurality of partial state estimation values $(\hat{z}_1, \hat{z}_2, \ldots \hat{z}_p; \hat{z}_i)$, the at least one processor is configured to perform:
a first calculation of generating a first observability matrix $(A_i^1)$ and a second observability matrix $(G)$, based on a property matrix $(A)$ of the dynamic state equation and an output matrix $(C)$ for the plurality of sensors,
a second calculation of generating a first linear transformation matrix $(M_i)$, based on a range space $(P)$ of a transpose matrix $(G^T)$ of the second observability matrix $(G)$ and orthogonal bases $(Q)$ of a null space of the second observability matrix $(G)$,
a third calculation of generating a second linear transformation matrix $(M_i A_i^1 M_i^T)$ by performing a coordinate change for the first observability matrix $(A_i^1)$ through the first linear transformation matrix $(M_i)$,
a fourth calculation of generating a fourth linear transformation matrix $(N_i' A_i^o N_i'^{-1})$ by performing a coordinate change for a matrix block $A_i^o$ through a third linear transformation matrix $N_i'$ making the matrix block $A_i^o$ of the second linear transformation matrix $(M_i A_i^1 M_i^T)$ to be block diagonal,
a fifth calculation of generating a sixth linear transformation matrix $(T_i)$, based on a fifth linear transformation matrix $(N_i)$ defined based on the third linear transformation matrix and, the first linear transformation matrix $(M_i)$,
a sixth calculation of generating a seventh linear transformation matrix $(U_i)$ and an eighth linear transformation matrix $(V_i)$, based on the sixth linear transformation matrix $(T_i)$ and an inverse matrix $(T_i^{-1})$ of the sixth linear transformation matrix $(T_i)$, and a seventh calculation of transforming the dynamic state equation, based on the seventh linear transformation matrix $(U_i)$ and the eighth linear transformation matrix $(V_i)$.

2. The apparatus of claim 1, wherein the at least on processor comprises a plurality of partial state Unknown Input Observers (partial state UIOs), and each of the partial state UIOs is configured to generate one partial state estimation value $(\hat{z}_i)$, based on an output value of one sensor among the plurality of sensors and the control input, the one sensor being different for each partial state UIO.

3. The apparatus of claim 2, wherein each partial state UIO is configured to generate one of the plurality of partial state estimation values $(\hat{z}_1, \hat{z}_2, \ldots \hat{z}_p; \hat{z}_i)$, based on an observer state $(g_i)$ induced by a dynamic state equation of the target system.

4. The apparatus of claim 1, wherein each of the plurality of partial state estimation values $(\hat{z}_1, \hat{z}_2, \ldots \hat{z}_p; \hat{z}_i)$ and the final state estimation value $(\hat{x}(t))$ is indicated by a vector, and a dimension of the vector indicating each partial state estimation value $(\hat{z}_i)$ is lower than a dimension of the vector indicating the final state estimation value $(\hat{x}(t))$.

5. The apparatus of claim 1, wherein the at least one processor is configured to:
determine a malfunction sensor number threshold, based on a number of sensors included in the plurality of sensors,
determine a number of cases for combinations of the plurality of partial state estimation values $(\hat{z}_1, \hat{z}_2, \ldots \hat{z}_p; \hat{z}_i)$, based on the malfunction sensor number threshold, and
select a partial state estimation value to be included in each of the plurality of candidate estimation values $(X(t))$ from among the plurality of partial state estimation values $(\hat{z}_1, \hat{z}_2, \ldots \hat{z}_p; \hat{z}_i)$ according to the number of cases.

6. The apparatus of claim 1, wherein the at least one processor is configured to:
determine, for every candidate estimation value $(X(t))$, the final state estimation value $(\hat{x}(t))$, based on a distance $(\|\hat{z}_i - U_i X\|_2)$ between the partial state estimation value $(\hat{z}_i)$ included in each candidate estimation value $(X(t))$ and a vector obtained by multiplying a first transformation matrix $(U_i)$ and each candidate estimation value $(X(t))$.

7. The apparatus of claim 6, wherein the first transformation matrix $(U_i)$ corresponds to a pseudo inverse matrix for linear transformation between the partial state estimation value $(\hat{z}_i)$ and a real state value $(x(t))$ of the target system.

8. A method of estimating a system state performed by at least one processor of the apparatus for estimating the system state, the method comprising:
generating a plurality of partial state estimation values $(\hat{z}_1, \hat{z}_2, \ldots \hat{z}_p; \hat{z}_i)$ for a current state of a target system, based on a control input for the target system and output values $(y_1, y_2, \ldots, y_p; y_i)$ of a plurality of sensors disposed in the target system corresponding to state observation values of the target system according to the control input;
determining a set $(\Gamma(\hat{z}(t)))$ of a plurality of candidate estimation values $(x(t))$ for a total state estimation value of the target system, based on the plurality of partial state estimation values $(\hat{z}_1, \hat{z}_2, \ldots \hat{z}_p; \hat{z}_i)$; and
determining a final state estimation value $(\hat{x}(t))$ for the current state of the target system among the plurality of candidate estimation values $(X(t))$, wherein the inducing of the observer states ($g_i$) comprises a first calculation operation of generating a first observability matrix ($A_i^1$) and a second observability matrix (G), based on a property matrix (A) of the dynamic state equation and an output matrix (C) for the plurality of sensors, a second calculation of generating a first linear transformation matrix ($M_i$), based on a range space (P) of a transpose matrix ($G^T$) of the second observability matrix (G) and orthogonal bases (Q) of a null space of the second observability matrix (G), a third calculation of generating a second linear transformation matrix ($M_i A_i^1 M_i^T$) by performing a coordinate change for the first observability matrix ($A_i^1$) through the first linear transformation matrix ($M_i$), a fourth calculation of generating a fourth linear transformation matrix ($N_i' A_i^{\bar{o}} N_i'^{-1}$) by performing a coordinate change for a matrix block $A_i^{\bar{o}}$ through a third linear transformation matrix ($N_i'$) making the matrix block $A_i^{\bar{o}}$ of the second linear transformation matrix ($M_i A_i^1 M_i^T$) to be block diagonal, a fifth calculation of generating a sixth linear transformation matrix ($T_i$), based on a fifth linear transformation matrix ($N_i$) defined based on the third linear transformation matrix and, the first linear transformation matrix ($M_i$), a sixth calculation of generating a seventh linear transformation matrix ($U_i$) and an eighth linear transformation matrix ($V_i$), based on the sixth linear transformation matrix ($T_i$) and an inverse matrix ($T_i^{-1}$) of the sixth linear transformation matrix ($T_i$), and a seventh calculation of transforming the dynamic state equation, based on the seventh linear transformation matrix ($U_i$) and the eighth linear transformation matrix ($V_i$).

9. The method of claim 8, wherein the generator comprises a plurality of partial state UIOs, and the method further comprises designing the plurality of partial state UIOs.

10. The method of claim 9, wherein the designing of the plurality of partial state UIOs comprises inducing observer states ($g_i$) of the plurality of partial state UIOs from a dynamic state equation of the target system.

11. The method of claim 9, wherein the plurality of partial state UIOs are associated with the plurality of sensors one to one, and the generating of the plurality of partial state estimation values ($\hat{z}_1, \hat{z}_2, \ldots \hat{z}_p$; $\hat{z}_i$) comprises determining each partial state estimation value ($\hat{z}_i$), based on an output value ($y_i$) of each sensor and an observer state ($g_i$) of the partial state UIO associated with each sensor.

12. The method of claim 8, wherein each of the plurality of partial state estimation values ($\hat{z}_1, \hat{z}_2, \ldots \hat{z}_p$; $\hat{z}_i$) and the final state estimation value ($\hat{x}(t)$) is indicated by a vector, and a dimension of the vector indicating each partial state estimation value ($\hat{z}_i$) is lower than a dimension of the vector indicating the final state estimation value ($\hat{x}(t)$).

13. The method of claim 8, wherein the determining of the set ($\Gamma(\hat{z}(t))$) of the plurality of candidate estimation values (X(t)) comprises:
determining a malfunction sensor number threshold, based on a number of a plurality of sensors;
determining a number of cases for combinations of the plurality of partial state estimation values ($\hat{z}_1, \hat{z}_2, \ldots \hat{z}_p$; $\hat{z}_i$), based on the malfunction sensor number threshold; and
selecting a partial state estimation value to be included in each of the plurality of candidate estimation values (X(t)) from among the plurality of partial state estimation values ($\hat{z}_1, \hat{z}_2, \ldots \hat{z}_p$; $\hat{z}_i$) according to the number of cases.

14. The method of claim 8, wherein the determining of the final state estimation value ($\hat{x}(t)$) comprises determining for every candidate estimation value X(t)), the final state estimation value ($\hat{x}(t)$), based on a distance ($\|\hat{z}_i - U_i X\|_2$) between the partial state estimation value ($\hat{z}_i$) included in each candidate estimation value (x(t)) and a vector obtained by multiplying a first transformation matrix ($U_i$) and each candidate estimation value (X(t)).

15. The method of claim 14, wherein the first transformation matrix ($U_i$) corresponds to a pseudo inverse matrix for linear transformation between the partial state estimation value ($\hat{z}_i$) and a real state value (x(t)) of the target system.

* * * * *